(12) United States Patent
Miftakhov et al.

(10) Patent No.: US 9,987,941 B2
(45) Date of Patent: Jun. 5, 2018

(54) SYSTEMS AND METHODS FOR LOCAL AUTONOMOUS RESPONSE TO GRID CONDITIONS BY ELECTRIC VEHICLE CHARGING STATIONS

(71) Applicant: Electric Motor Werks, Inc., San Carlos, CA (US)

(72) Inventors: Valery Miftakhov, San Carlos, CA (US); Alexander Gurzhi, San Jose, CA (US); Chris Edgette, Oakland, CA (US); Alan White, Tuburon, CA (US)

(73) Assignee: Electric Motor Werks, Inc., San Carlos, CA (US)

( * ) Notice: Subject to any disclaimer, the term of this patent is extended or adjusted under 35 U.S.C. 154(b) by 0 days. days.

(21) Appl. No.: 14/853,955

(22) Filed: Sep. 14, 2015

(65) Prior Publication Data

US 2016/0257214 A1 Sep. 8, 2016

Related U.S. Application Data

(60) Provisional application No. 62/050,147, filed on Sep. 14, 2014.

(51) Int. Cl.
*H02J 7/00* (2006.01)
*B60L 11/18* (2006.01)

(52) U.S. Cl.
CPC ......... *B60L 11/1844* (2013.01); *H02J 7/0027* (2013.01); *Y02T 10/7055* (2013.01); *Y02T 90/168* (2013.01); *Y04S 30/12* (2013.01)

(58) Field of Classification Search
USPC .................................................. 320/107–115
See application file for complete search history.

(56) References Cited

U.S. PATENT DOCUMENTS

| 2009/0021213 A1* | 1/2009 | Johnson ............... B60L 11/005 320/109 |
| 2010/0013436 A1* | 1/2010 | Lowenthal ............ G06Q 30/04 320/109 |
| 2010/0201309 A1* | 8/2010 | Meek .................. B60L 11/1816 320/108 |
| 2015/0091506 A1* | 4/2015 | Hyde ................. B60L 11/1848 320/108 |

* cited by examiner

*Primary Examiner* — Binh Tat
(74) *Attorney, Agent, or Firm* — TransPacific Law Group; Pabel I. Pogodin, Esq.

(57) ABSTRACT

A system for generating a local autonomous response to a condition of an electric grid by electric vehicle charging stations, comprising: a first electricity meter for reading current, frequency, or voltage from a first electricity supply line to one electric vehicle charging station; a second electricity meter for reading current, frequency, or voltage from a second electricity supply line to all of the electric vehicle charging stations; a third electricity meter for reading current, frequency, or voltage from a third electricity line from one or more renewable generators; and an electric vehicle charging controller operatively coupled to the first electricity meter, the second electricity meter, the third electricity meter and the electric vehicle charging stations and operable to obtain readings from the first electricity meter, the second electricity meter and the third electricity meter and to control the electric vehicle charging stations based on the obtained readings.

20 Claims, 4 Drawing Sheets

SYSTEMS AND METHODS FOR LOCAL AUTONOMOUS RESPONSE TO GRID CONDITIONS BY ELECTRIC VEHICLE CHARGING STATIONS

CROSS-REFERENCE TO RELATED PATENT APPLICATION

This regular U.S. patent application relies upon and claims the benefit of priority from U.S. provisional patent application No. 62/050,147, entitled "Grid Stabilization via a Large Distributed Collection of EV Charging Stations," filed on Sep. 14, 2014 and incorporated by reference herein in its entirety.

FIELD OF THE INVENTION

The disclosed embodiments relate in general to the field of electrical vehicle charging technology and power grid management and, more specifically, to systems and methods for local autonomous response to grid conditions by electric vehicle charging stations.

DESCRIPTION OF THE RELATED ART

There are close to 200,000 Plug-In Electric Vehicles (EVs) in the US alone today. This number is projected to grow to over 1 Million by 2017. In order to "re-fuel", every EV needs an "EVSE"—an EV Charging Station. A charging station supplies a certain amount of AC or DC power to the vehicle. The process is generally controlled by the vehicle that uses its internal Battery Management System's logic to determine the power to draw from the system—up to the total maximum power level allowed by the EVSE. The latter is normally set to a fixed level during EVSE manufacturing process.

A typical American EV consumes ~10-15 KWHr of energy every day to recharge its batteries—this amount of energy is sufficient to provide ~30-50 miles of daily driving (which is consistent with a US average commute distances).

A typical recharge time to transfer that amount of energy from the AC grid to the battery is 90 minutes. However, the amount of time available for such a recharge is generally over 23 hours during a typical 24-hour day. Moreover, there are at least two blocks of this time when a typical EV spends 8+ hours in one location. These locations are the home of the driver and her workplace. This difference between time available and actual time required for charging creates an opportunity to reduce the instantaneous charging power and still satisfy the driver's requirements for a full recharge for a day. E.g., if one were to spread the charging power uniformly over a 16-hour period (8 hours at work+8 hours at home), a typical EV can be recharged for a day at just 0.6 kW average power.

This ability to reduce instantaneous charging power can be utilized to modulate the instantaneous power drawn from a collection of EVs by modulating charging current via EV charging stations. Such modulation capability can then be used to provide various stabilization services to the Electrical Grid (e.g., Demand Management, Frequency Regulation, Peak Shaving, Economic Demand Response, etc.).

By the very nature of the Electrical Grid, Supply (electricity generation, in Watts) and Demand (electricity consumption, in Watts) have to be perfectly balanced at each point in time. Any imbalance creates undesirable effects in the Grid (e.g., deviation of the grid frequency from the set mean point—60 Hz in the USA).

To counteract this, Grid operators (ISOs, or independent system operators) operate a specialized marketplace where it buys an ability to modulate generation & demand in near-real-time (on time intervals of seconds to minutes).

Currently, electric vehicle supply equipment (EVSE, aka EV charging stations) does not provide automatic responses to local conditions or to the changing needs of the larger electric power grid. Services that might be provided by automatic dispatch include optimization and reliability functions for the local residential, industrial, or commercial site. They may also include local site functions that can help stabilize the wider power grid. Autonomous services are services that can be provided by an EVSE without directed dispatch by the equipment owner or operator.

Therefore, new and improved systems and methods for providing automatic responses to local conditions or to the changing needs of the larger electric power grid are needed.

SUMMARY OF THE INVENTION

The inventive methodology is directed to methods and systems that substantially obviate one or more of the above and other problems associated with conventional systems and methods for electrical vehicle charging and power grid management.

In accordance with one aspect of the embodiments described herein, there is provided a system for generating a local autonomous response to a condition of an electric grid by a plurality of electric vehicle charging stations, the system incorporating: a first electricity meter for reading current, frequency, or voltage from a first electricity supply line to one of the plurality of electric vehicle charging stations; a second electricity meter for reading current, frequency, or voltage from a second electricity supply line to all of the plurality of electric vehicle charging stations; a third electricity meter for reading current, frequency, or voltage from a third electricity line from one or more renewable generators; and an electric vehicle charging controller operatively coupled to the first electricity meter, the second electricity meter, the third electricity meter and the plurality of electric vehicle charging stations and operable to obtain readings from the first electricity meter, the second electricity meter and the third electricity meter and to control at least one of the plurality of electric vehicle charging stations based on the obtained readings.

In one or more embodiments, the electric vehicle charging controller comprises a server disposed on a computer network and wherein the electric vehicle charging controller is coupled to the first electricity meter, the second electricity meter, the third electricity meter and the plurality of electric vehicle charging stations via the computer network.

In one or more embodiments, the system further comprises a remote server executing a vehicle charge control application.

In one or more embodiments, the electric vehicle charging controller comprises an internal logic to determine an appropriate charging output in response to the obtained readings.

In one or more embodiments, the electric vehicle charging controller is operable to direct the plurality of electric vehicle charging stations to vary charging load to one or more electric vehicles based upon the internal logic.

In one or more embodiments, the electric vehicle charging controller is configured to control one or more electric power generators based upon the internal logic.

In one or more embodiments, the electric vehicle charging controller comprises a local storage for storing custom presets relating to a local circuit or a local utility feeder, a frequency response requirements, or CVR requirements.

In one or more embodiments, each of the plurality of electric vehicle charging stations varies rate of charge or discharge according commands received from the electric vehicle charging controller.

In one or more embodiments, each of the plurality of electric vehicle charging stations is configured to receive vehicle owner preferences with respect to vehicle charging.

In one or more embodiments, each of the plurality of electric vehicle charging stations is configured to display to a user or to output to an outside application:
 i. a real time charging information;
 ii. a vehicle owner charging preferences;
 iii. alerts regarding a charging status;
 iv. a vehicle state of charge; and
 v. and estimated time to completion of charge.

In accordance with one aspect of the embodiments described herein, there is provided a method for generating a local autonomous response to a condition of an electric grid by a plurality of electric vehicle charging stations, the method comprising: providing a first electricity meter for reading current, frequency, or voltage from a first electricity supply line to one of the plurality of electric vehicle charging stations; providing a second electricity meter for reading current, frequency, or voltage from a second electricity supply line to all of the plurality of electric vehicle charging stations; providing a third electricity meter for reading current, frequency, or voltage from a third electricity line from one or more renewable generators; and providing an electric vehicle charging controller operatively coupled to the first electricity meter, the second electricity meter, the third electricity meter and the plurality of electric vehicle charging stations and operable to obtain readings from the first electricity meter, the second electricity meter and the third electricity meter and to control at least one of the plurality of electric vehicle charging stations based on the obtained readings.

In one or more embodiments, the electric vehicle charging controller comprises a server disposed on a computer network and wherein the electric vehicle charging controller is coupled to the first electricity meter, the second electricity meter, the third electricity meter and the plurality of electric vehicle charging stations via the computer network.

In one or more embodiments, the method further comprises providing a remote server executing a vehicle charge control application.

In one or more embodiments, the electric vehicle charging controller comprises an internal logic to determine an appropriate charging output in response to the obtained readings.

In one or more embodiments, the electric vehicle charging controller is operable to direct the plurality of electric vehicle charging stations to vary charging load to one or more electric vehicles based upon the internal logic.

In one or more embodiments, the electric vehicle charging controller is configured to control one or more electric power generators based upon the internal logic.

In one or more embodiments, the electric vehicle charging controller comprises a local storage for storing custom presets relating to a local circuit or a local utility feeder, a frequency response requirements, or CVR requirements.

In one or more embodiments, each of the plurality of electric vehicle charging stations varies rate of charge or discharge according commands received from the electric vehicle charging controller.

In one or more embodiments, each of the plurality of electric vehicle charging stations is configured to receive vehicle owner preferences with respect to vehicle charging.

In one or more embodiments, each of the plurality of electric vehicle charging stations is configured to display to a user or to output to an outside application:
 vi. a real time charging information;
 vii. a vehicle owner charging preferences;
 viii. alerts regarding a charging status;
 ix. a vehicle state of charge; and
 x. and estimated time to completion of charge.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
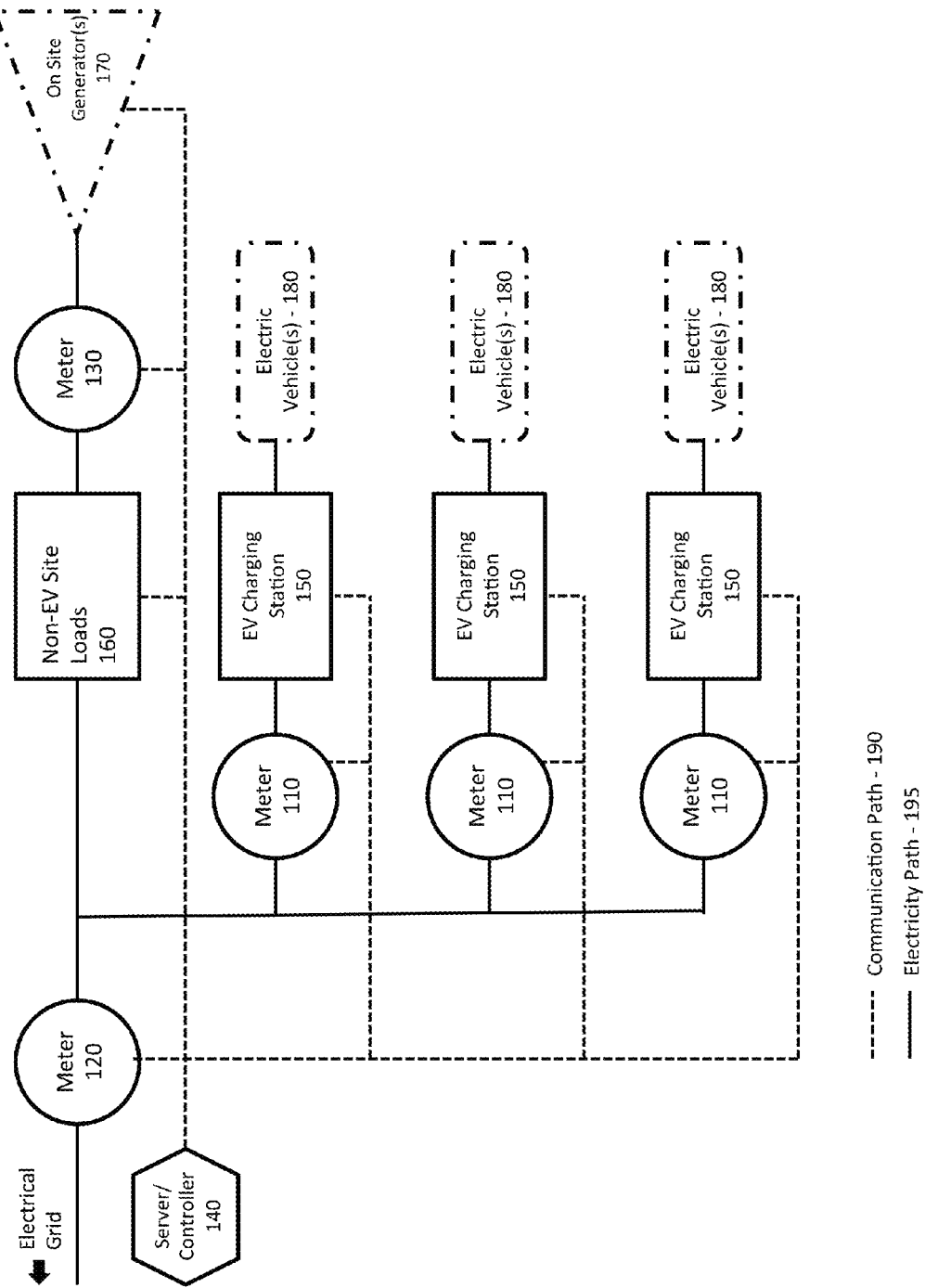
FIG. 1 illustrates an exemplary embodiment of a logical diagram of a distributed system configuration based on which the functionality described herein may be deployed.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

In accordance with one aspect of the embodiments described herein, there are provided a novel system and method in which an aggregated system of controllable EV charging stations exploits an ability to modulate charging power rates to provide such services to the grid operators.

In accordance with another aspect of the embodiments described herein, there are provided systems and methods for generating automatic responses to local conditions or to the changing needs of the larger electric power grid.

Embodiments of the described invention provide several important services to the local site as well as the wider electric grid, through local automatic response of an EVSE. In one or more embodiments, when a plug in vehicle is charging, the EVSE can provide several automatic services, each of which provides value in different ways. Services and their automatic responses include one or more of the following functionalities, which should note be interpreted in a limited sense:

1. Dynamic load sharing. With dynamic load sharing, several EVSEs automatically coordinate to optimize an electrical circuit. Without dynamic load sharing, the number of EVSEs that may be added to a circuit and/or feeder is capped by the maximum current rating of all EVSEs, such that the combined maximum current draw of all EVSEs operating simultaneously at full charge will never exceed the capacity of the circuit on which they are installed. This limits the number of EVSEs that can be installed on a circuit. If more EVSEs are desired on a circuit, the entire circuit must be upgraded, at significant expense. The vast majority of the time, all EVSEs on a circuit are not needed, as vehicles are either not plugged in to every EVSE, or the vehicles that are plugged in have already been fully charged. The limitation on the number of EVSEs on a circuit can be solved by enabling individual or groups of EVSEs to automatically reduce their charging current in cases where most or all EVSEs are operating simultaneously, such that the aggregated group of EVSEs never exceed the current carrying capacity of the circuit. This invention includes automatic charging current reduction with awareness of the circuit limits and the aggregated charging current of other EVSEs in the group.

2. Local load control. This capability is similar to Dynamic Load Sharing, wherein individual EVSEs and/or groups of EVSEs automatically reduce their charging loads to optimize the loads on the site. The difference is that, in Local Load Control, individual and/or groups of EVSEs can automatically reduce individual charging loads in coordination with other site loads (e.g. air conditioning units, lighting), to maintain an overall site load lower than the limit of the electrical feeder to the site. The benefit is that more EVSEs may be added to a site than would otherwise be possible under the existing feeder limits. This capability may also be used to reduce customer retail demand.

3. Load Coordination with On Site Renewables: With this capability, EVSE loads may be automatically varied based upon the output of on site renewable generators. These generators may include, but are not limited to, on site solar, wind, biogas, fuel cells, or geothermal generators. Automated coordination of EVSEs may allow increased capture of renewable energy, reduced customer electric bills, and/or reduced current flow to or from the site, as needed to optimize the overall customer electrical load and electric bill savings.

4. Conservation Voltage Reduction: Conservation Voltage Reduction (CVR) is a technology used for reducing energy and peak demand. CVR is implemented upstream of end service points in the distribution system so that the efficiency benefits are realized by consumers and the electric distributor. This invention proposes adding automated CVR capabilities to EVSEs to provide local benefits to the site and electric distributor hosting the charging stations.

5. Frequency Response: With this capability, EVSEs automatically senses a frequency drop on the grid and cease charging to help stabilize grid frequency. EVSEs will represent significant grid loads in the future electricity system, so the capability to automatically and quickly reduce charging load in response to grid frequency can provide great benefits to the grid at a very low cost.

In one or more embodiments, individual EVSEs and/or groups of EVSEs are configured to measure any or all of the following parameters: grid frequency, grid voltage, customer electrical load, individual EVSE load, and aggregated EVSE load. In one or more embodiments, individual EVSEs and/or groups of EVSEs with on board logic to respond to any or all of the above measurements. On-board logic may seek to optimize supply current to any or all of the following functions: dynamic load sharing, load coordination with on site renewables, conservation voltage reduction, and/or frequency response. In one or more embodiments, individual EVSEs and/or groups of EVSEs are provided with on-board capability to vary their supply current to plug-in electric vehicles in response to the on-board logic described above.

FIG. 1 illustrates an exemplary embodiment of a distributed system configuration based on which the functionality described herein may be deployed. The elements shown in FIG. 1 are described in detail below.

Element 110—Meter: Electricity meter(s) for reading current, frequency, and/or voltage from the electricity line to an individual EV charging station. Capable of returning meter readings via communication path to one or more EV charging station(s). This meter may be integrated into the EV charging station.

Element 120—Meter: Electricity meter for reading current, frequency, and/or voltage from the electricity line to the entire site. Capable of returning meter readings via communication path to one or more EV charging station(s). This meter is not required for all aspects of this invention.

Element 130—Meter: Electricity meter(s) for reading current, frequency, and/or voltage from the electricity line from one or more on site renewable generators. Capable of returning meter readings via communication path to one or more EV charging station(s). This meter is not required for all aspects of this invention.

Element 140—Master Controller/Server: An electric vehicle charging controller with the following features:
  a. Connections to various electrical meters on site and the capacity to read those meters;
  b. Connection to user application hosted on outside server and/or station controls;
  c. Logic to determine appropriate charging output in response to one or more meter readings;
  d. Capacity to direct EV charging stations (150) to vary charging load to one or more electric vehicles based upon internal logic;
  e. Capacity to incorporate and store custom presets regarding the local circuit and/or utility feeder, frequency response requirements, and/or CVR requirements.

It should be noted that this server functionality could potentially be integrated into one or more of the EV charging stations, see Element 150.

Element 150—EV Charging Station with Slave Controls: An electric vehicle charging station with the following features:
  a. Capacity to vary charge and discharge according to internal controls, application directions;
  b. Capacity to receive vehicle owner preferences on station or via outside application;
  c. Capacity to display or output to outside app one or more of the following:
    i. Real time charging information;
    ii. Vehicle owner charging preferences;
    iii. Alerts regarding charging status;

iv. Vehicle state of charge; and/or v. Estimated time to completion of charge.

Element 160—Non-EV Site Loads: Non-EV Site loads comprise loads such as air conditioning, lighting, plug loads, etc. It should be noted that these loads may be independently metered and/or controlled by EV charging station autonomous logic controls.

Element 170—On Site Generator(s): Renewable and/or non-renewable generators may be located behind or in front of site loads. They may be controllable by EV charging station logic.

Element 180—Electric Vehicle(s): One or more electric vehicles intermittently connected to the EV charging station. These vehicles may exist in various states of charge.

Element 190—Communication Path: Path between meters, EV charging stations, load controls, on site generators, and/or non-EV site loads. This communication path may be implemented using any now known or later developed interconnect.

Element 195—Electricity Path: Conductors transmitting electrical energy from the grid to various site loads and generators.

Figure 2:
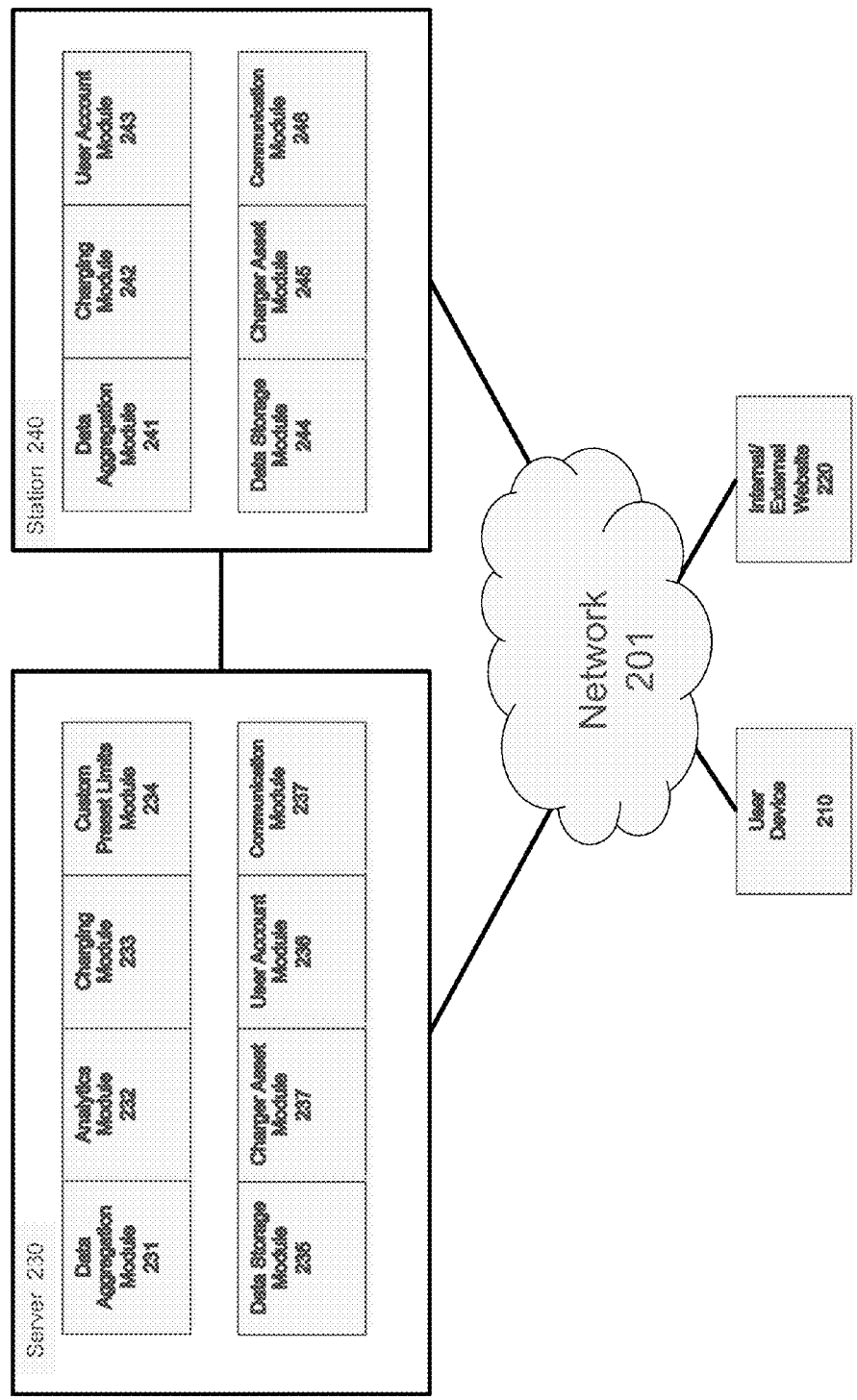
FIG. 2 illustrates exemplary internal data flows between the components shown in the logical diagram of FIG. 1.

FIG. 2 illustrates exemplary internal data flows between the components shown in the logical diagram of FIG. 1.

Figure 3:
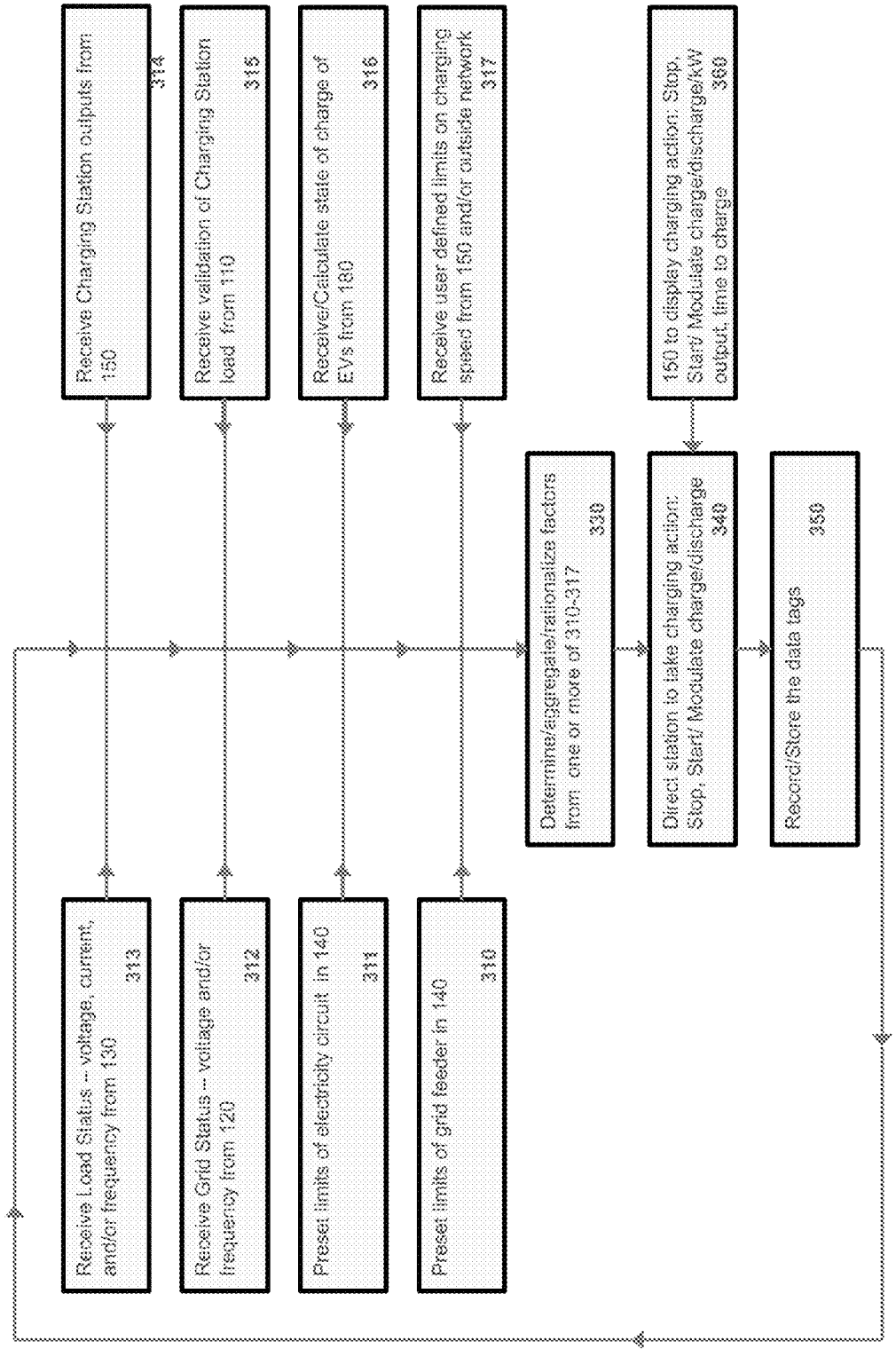
FIG. 3 illustrates an exemplary block diagram of automated dispatch by a server or station.
Figure 4:
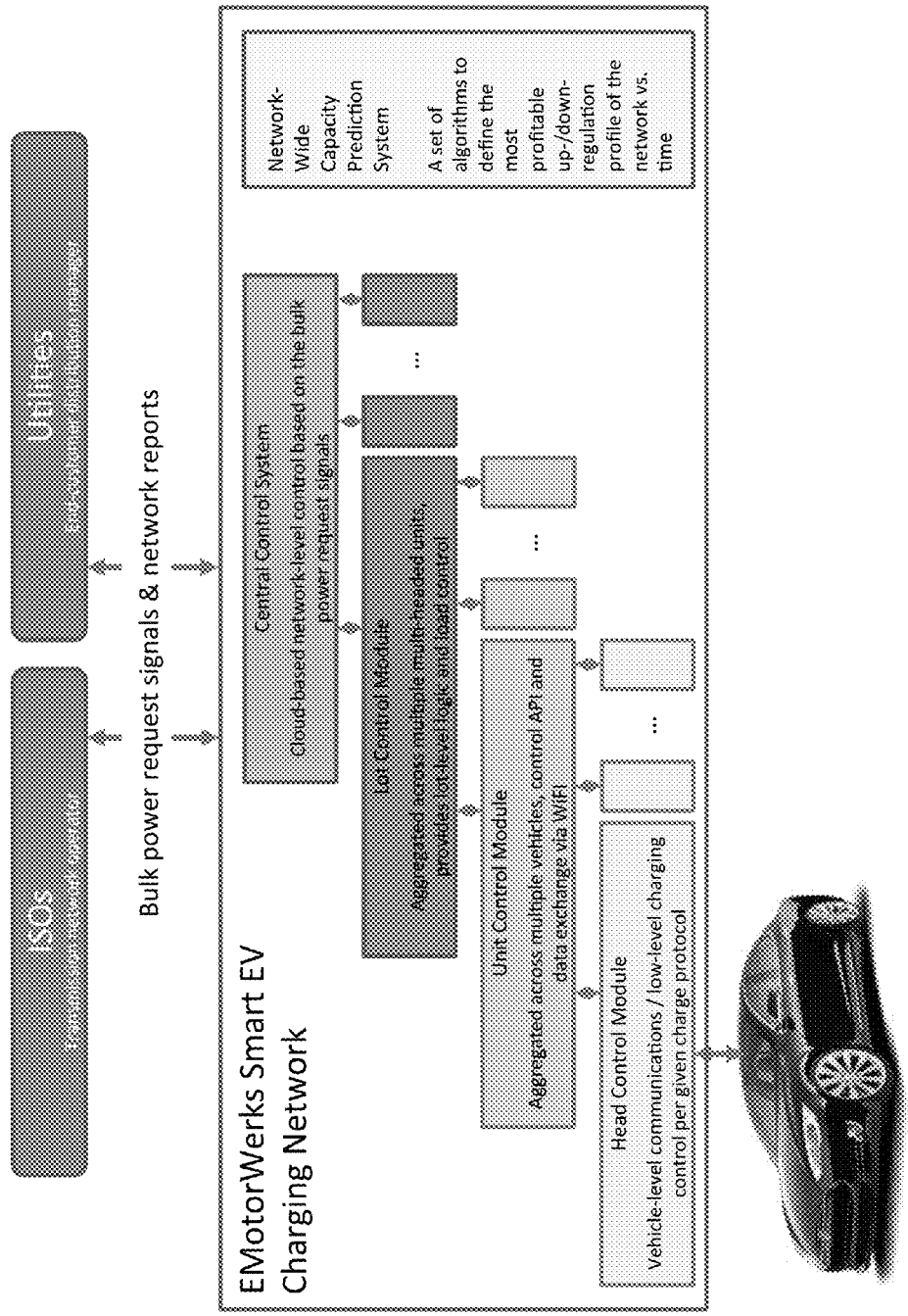
FIG. 4 illustrates an exemplary embodiment of a grid stabilization via a large distributed collection of EV charging stations.

FIG. 3 illustrates an exemplary block diagram of automated dispatch by server or station.

1. Vehicle-level Charging Control System: a system to implement a controllable charging rate using the appropriate standard charging protocols—at a single vehicle level (named "Head"-level in the rest of this document). This system is abbreviated as HCM (head control module) in the rest of this document.

a. A sub-system providing a low-level charging protocol implementation (analog for J1772 SAE standard for Level 2 charging, analog+digital for CHAdeMO JST standard for Level 3 charging, etc.)

b. A sub-system providing control API layer to allow the HCM to modulate the rate of charge of the vehicle c. A sub-system providing physical control interface (such as SPI, CANbus, etc.) to allow information transfer from and to the HCM.

2. Unit-level Charging Control System: a system & algorithm to adjust charging rates of individual charging heads to optimize the charging outcome given all constraints.

a. A Unit-level system is an aggregation of Heads in immediate physical proximity of each other (generally within a few meters—a distance when a wired information connection can be effectively made).

b. A Unit-level system is generally composed of a physically integrated set of Heads, often in one enclosure.

c. A Unit-level system generally has a single electrical feed powering multiple Heads together with the main Unit Control Module (UCM).

i. In one embodiment, a simple 240V 40 A service is deployed to power a unit with six Heads, thereby reducing the amount of labor and material by a factor of 3-6 relative to a single—/dual-head station deployment.

d. A sub-system to gather charging occasion information based on: i. Vehicle type.

1. identification of the vehicles based on the captured image of the vehicle with on-board camera.

2. identification of the vehicles based on the characteristic form of the charging current ramp-up/ramp-down.

3. identification of the vehicles based on the maximum amount of power drawn by the vehicle's charger.

User Profile (if Properly Authenticated)

1. using over-time heuristics to predict likely state of charge of the user's vehicle when he/she arrives at the charging station (e.g., a person normally has the same commute distance every day, hence we could measure the energy intake on one day and then assume the same for following days)

iii. Historical load profile vs time at the particular UCM (minute-by-minute)

e. A sub-system that converts these informational elements into an estimate of how much flexibility it has to modulate the charging current for the vehicles that are plugged in to the station f. UCM-level system to be connected to both Head-level and Lot-level systems via a physical network layer for bi-directional information transfer. The individual modules would then be addressed using a specialized addressing scheme.

g. Note that Head-level and UCM-level control can be implemented in the same physical device when there is only one Head installed in a UCM (as will be the case in a residential installation).

3. Lot-level Charging Control System: a system & algorithm to adjust Unit-level charging control decisions based on the Lot-level charging context. Abbreviated as LCD (Lot Control Module) in this document.

a. A Lot-level system is an aggregation of multiple UCMs in physical proximity to each other (generally within the range of WiFi connectivity)

b. Context to be based on (including but not limited to):

i. Total amount of power available from the Lot-level power feed (e.g., power supply capacity for the building equipped with a number of UCMs)

ii. Historical load profile vs time at the particular Lot c. Lot-level system to be connected to both Unit-level and Central Load Control Systems via a wireless network layer for bi-directional information transfer d. Note that Lot-level and UCM-level control can be implemented in the same physical device when there is only one UCM installed in a Lot (as will be the case in a residential installation).

4. Central Load Control System: a system to receive control signals from the Grid Operators and convert them into the set of Lot-level control commands across the EV Station network.

a. A sub-system to receive external control signals from the Grid Operators.

b. A sub-system to execute automatic negotiations between the central load control system and each of the UCMs.

i. UCMs constantly report their modulation capacity to the Central System based on the Charging Occasion Information.

1. Optimal modulation capacity—capacity that will result in the 95% confidence level in achieving user-level SLA (charge complete by the time user plugs out)

2. Maximum modulation capacity—maximum amount of power that can be drawn by the EVs plugged into the station at the moment.

The central system determines the amount of desired demand modulation

1. Based on the external control signals and modulation capacity information gathered from the appropriate part of the network.

2. The system makes an intelligent risk management decision to deviate from the optimal modulation level to maximize total potential revenues while containing user SLA risks.

5. Robust Network Management Approach: a process and system design to perform all technical system management tasks.

a. A set of connection protocols to link all sub-systems together and control them in a unified fashion to achieve the desired overall functionality:

Head-level to UCM-level via hardwired connection for security (e.g., SPI bus)

UCM-level to Lot Management level via encrypted WiFi

Lot Management level to Central Load Control System via encrypted GPRS (cellular link)

b. A software and hardware capability to update station's firmware over the air, without the need for field visits c. A sub-system to monitor station's health status remotely based on direct reports from UCM-/Lot-level systems and based on analysis of in-period charging statistics with respect to the historical baselines 6. Predictive load modeling software: a distributed computer program designed to predict network's capacity to respond to load management signals at any time a. Outputs i. Utility-ready prediction of the Down-regulation and Up-regulation capacity by pre-defined load aggregation areas (down-regulation=ability to REDUCE the load, up-regulation=ability to INCREASE the load).

ii. Current state+prediction of future capacity in 1-minute intervals for 60 minutes ahead.

b. Inputs i. User-supplied data ii. Network-supplied data

1. Real-time

2. Historical iii. Additional context data c. Modeling approach i. Map all Units onto the topology of the grid network chosen by the partner utilities.

1. Multiple utilities/topologies can be used to create multiple load models.

2. Further text describes modeling approach at the individual node level of such a topology.

3. One example of a node can be a SLAP-2 area (Sub-Load Aggregation Point) in San Francisco Bay Area, covering ~1 million population across ~300,000 households, with total average electricity consumption of ~500 MW (commercial and residential) ii. Build up the prediction of the power-distribution-node-level down- and up-regulation capacity by aggregating head-level predictions and applying constraints from each aggregation level of the network 1. For each head, model minimum and maximum permissible charging current. Initial elements of the approach include:

a. Associate each head with a specific vehicle i. In residential installations, association is generally trivial 1. User will supply vehicle data at the time of installation/sign-up.

2. One head is used with the same vehicle vast majority of the time

3. In case when households have more than one vehicle, the association is still relatively simple by using ramp-up signatures and max charging power 4. As a result, Vehicle ID profile structure is built by the unit In commercial installations, association is more complex given higher mobility of the vehicles across charging spots. Therefore, additional data will be collected to assist association 1. Unit Control Module will be equipped with a video camera that will take snapshots of all vehicles plugged in 2. UCM software will then pre-process the images into vehicle ID profile elements such as license plate number, color, make and model (based on shape of the car)

3. Vehicle ID profile is then augmented with additional vehicle ID data based on electrical parameters of the charging session—such as power ramp rate on plug-in and max power achieved Vehicle ID Profiles will then be transmitted along with the Lot ID to the Central Control System (CCS) where they will be matched against known vehicle database (at the Lot level) and the association will be finalized for each charging session b. Using historical plug-in/plug-out/charge duration times, build a 'Vehicle Availability & Energy Profile' for each Head-Vehicle combination i. This will allow the system to understand the typical patterns of use for the vehicle.

ii. The pattern data will include

1. Probability of the Vehicle availability at the Head location by minute of day —separately for each day of the week 2. Probability distribution of the depth of discharge of the Vehicle at the moment of plug-in by time of day of plug-in and the number of plug-ins prior to that iii. These patterns of use will then be factored into the Head-level capacity prediction algorithm. The output of such algorithm will be Capacity=f(time of day, day of week, number of plug-ins before this one during same day). Capacity will be expressed in the units of kWHr.

iv. These patterns will also be used to create a prediction of Demand which will attempt to approximate the amount of energy needed to be in the Vehicle's battery at any point in time in order to satisfy the Vehicle's use patterns.

1. For example, if the vehicle is usually unplugged at 8 pm for a 10-mile trip on Fridays (e.g., to go to the Movies), spending 3 KWHrs for that trip, Demand (8 pm) will be =3 KWHrs v. Finally, an estimate of the energy content in the Vehicle battery will be made and distribution of that Content will be created vs time c. These capacity, content, and demand predictions will then be combined with the Vehicle-level information on the maximum charging power to produce a distribution of the minimum and maximum charge current that is likely available at a given Head-Vehicle combo at any given time for the next 60 minutes i. Minimum charge current will be defined by the need to meet demand at the next plug-out moment ii. Maximum charge current will be defined by the charger rating 2. These min/max current predictions will then be combined with restrictions from the higher-level network tiers to arrive at the adjusted Head Regulation Ability (2 numbers will be provided—one for up-regulation, one—for down-regulation)

a. Unit-level module will apply constraints on the total power available to all Heads connected to the UCM In cases of multi-headed units with SUM(head power rating)>power rating of the Unit connection to the grid, max current available to each Head will be reduced The reduction for each specific Head will depend on the vehicle demand profile and energy content. For vehicles with smaller energy reserves (=higher probability of not meeting demand), max current will be reduced less—at the expense of the other Heads present on this unit.

These adjustments will be recalculated any time Head-Vehicle configurations change at the unit level (e.g., one car leaves)

b. Lot-level module will apply constraints on the total power available to all Units connected to the LCM—using similar logic described for UCM-level adjustment c. The resulting fully adjusted Head-level min/max current levels will be combined with predicted regulation demand to produce the Most Beneficial Charge Rate for each head The initial MBCR will be set to a mid-point between min and max permissible charge rates. It will then be adjusted based on the predicted regulation demand If the regulation requests at that particular time mostly expected to be down-regulation requests (i.e. requests to increase the load), the system will REDUCE MBCR to provide more room for increasing the charge current Conversely, if the reg requests are mostly expected to be up-regulation requests, the system will INCREASE MBCR d. The difference between min charge rate and MBCR and MBCR and max charge rate will be calculated and designated as UP-REGULATION CAPACITY and DOWN-REGULATION CAPACITY 3. These adjusted head-level regulation capacities will then be combined at the power-distribution-network-node-level to produce aggregated network regulation capacities 4. These capacities will then be used to announce EV Charging Network capability to the Utilities at any point in time Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive.

Moreover, other implementations of the invention will be apparent to those skilled in the art from consideration of the specification and practice of the invention disclosed herein. Various aspects and/or components of the described embodiments may be used singly or in any combination in systems and methods for generating automatic responses to local conditions or to the changing needs of the larger electric power grid. It is intended that the specification and examples be considered as exemplary only, with a true scope and spirit of the invention being indicated by the following claims.

What is claimed is:

1. A system for generating a local autonomous response to a condition of an electric grid by a plurality of electric vehicle charging stations, the system comprising:
    a. a first electricity meter for reading current, frequency, or voltage from a first electricity supply line to one of the plurality of electric vehicle charging stations;
    b. a second electricity meter for reading current, frequency, or voltage from a second electricity supply line to all of the plurality of electric vehicle charging stations;
    c. a third electricity meter for reading current, frequency, or voltage from a third electricity line from one or more renewable generators; and
    d. an electric vehicle charging controller operatively coupled to the first electricity meter, the second electricity meter, the third electricity meter and the plurality of electric vehicle charging stations and operable to obtain readings from the first electricity meter, the second electricity meter and the third electricity meter and to control at least one of the plurality of electric vehicle charging stations based on the obtained readings.

2. The system for generating a local autonomous response to a condition of an electric grid of claim 1, wherein the electric vehicle charging controller comprises a server disposed on a computer network and wherein the electric vehicle charging controller is coupled to the first electricity meter, the second electricity meter, the third electricity meter and the plurality of electric vehicle charging stations via the computer network.

3. The system for generating a local autonomous response to a condition of an electric grid of claim 1, further comprising a remote server executing a vehicle charge control application.

4. The system for generating a local autonomous response to a condition of an electric grid of claim 1, wherein the electric vehicle charging controller comprises an internal logic to determine an appropriate charging output in response to the obtained readings.

5. The system for generating a local autonomous response to a condition of an electric grid of claim 4, wherein the electric vehicle charging controller is operable to direct the plurality of electric vehicle charging stations to vary charging load to one or more electric vehicles based upon the internal logic.

6. The system for generating a local autonomous response to a condition of an electric grid of claim 4, wherein the electric vehicle charging controller is configured to control one or more electric power generators based upon the internal logic.

7. The system for generating a local autonomous response to a condition of an electric grid of claim 1, wherein the electric vehicle charging controller comprises a local storage for storing custom presets relating to a local circuit or a local utility feeder, a frequency response requirements, or CVR requirements.

8. The system for generating a local autonomous response to a condition of an electric grid of claim 1, wherein each of the plurality of electric vehicle charging stations varies rate of charge or discharge according commands received from the electric vehicle charging controller.

9. The system for generating a local autonomous response to a condition of an electric grid of claim 1, wherein each of the plurality of electric vehicle charging stations is configured to receive vehicle owner preferences with respect to vehicle charging.

10. The system for generating a local autonomous response to a condition of an electric grid of claim 1, wherein each of the plurality of electric vehicle charging stations is configured to display to a user or to output to an outside application:
    i. a real time charging information;
    ii. a vehicle owner charging preferences;

iii. alerts regarding a charging status;
iv. a vehicle state of charge; and
v. and estimated time to completion of charge.

11. A method for generating a local autonomous response to a condition of an electric grid by a plurality of electric vehicle charging stations, the method comprising:
   a. providing a first electricity meter for reading current, frequency, or voltage from a first electricity supply line to one of the plurality of electric vehicle charging stations;
   b. providing a second electricity meter for reading current, frequency, or voltage from a second electricity supply line to all of the plurality of electric vehicle charging stations;
   c. providing a third electricity meter for reading current, frequency, or voltage from a third electricity line from one or more renewable generators; and
   d. providing an electric vehicle charging controller operatively coupled to the first electricity meter, the second electricity meter, the third electricity meter and the plurality of electric vehicle charging stations and operable to obtain readings from the first electricity meter, the second electricity meter and the third electricity meter and to control at least one of the plurality of electric vehicle charging stations based on the obtained readings.

12. The method for generating a local autonomous response to a condition of an electric grid of claim 11, wherein the electric vehicle charging controller comprises a server disposed on a computer network and wherein the electric vehicle charging controller is coupled to the first electricity meter, the second electricity meter, the third electricity meter and the plurality of electric vehicle charging stations via the computer network.

13. The method for generating a local autonomous response to a condition of an electric grid of claim 11, further comprising providing a remote server executing a vehicle charge control application.

14. The method for generating a local autonomous response to a condition of an electric grid of claim 11, wherein the electric vehicle charging controller comprises an internal logic to determine an appropriate charging output in response to the obtained readings.

15. The method for generating a local autonomous response to a condition of an electric grid of claim 14, wherein the electric vehicle charging controller is operable to direct the plurality of electric vehicle charging stations to vary charging load to one or more electric vehicles based upon the internal logic.

16. The method for generating a local autonomous response to a condition of an electric grid of claim 14, wherein the electric vehicle charging controller is configured to control one or more electric power generators based upon the internal logic.

17. The method for generating a local autonomous response to a condition of an electric grid of claim 11, wherein the electric vehicle charging controller comprises a local storage for storing custom presets relating to a local circuit or a local utility feeder, a frequency response requirements, or CVR requirements.

18. The method for generating a local autonomous response to a condition of an electric grid of claim 11, wherein each of the plurality of electric vehicle charging stations varies rate of charge or discharge according commands received from the electric vehicle charging controller.

19. The method for generating a local autonomous response to a condition of an electric grid of claim 11, wherein each of the plurality of electric vehicle charging stations is configured to receive vehicle owner preferences with respect to vehicle charging.

20. The method for generating a local autonomous response to a condition of an electric grid of claim 11, wherein each of the plurality of electric vehicle charging stations is configured to display to a user or to output to an outside application:
   i. a real time charging information;
   ii. a vehicle owner charging preferences;
   iii. alerts regarding a charging status;
   iv. a vehicle state of charge; and
   v. and estimated time to completion of charge.

* * * * *